INVENTORS:
HARRY KATZ
SIDNEY SCHNEIDER

ATTORNEY

United States Patent Office 3,621,575
Patented Nov. 23, 1971

3,621,575
IN-SITU DENTURE AND METHOD OF
FORMATION
Sidney Schneider, 576 Sussex Ave., Morristown, N.J. 07960, and Harry Katz, 785 Pleasant Valley Way, West Orange, N.J. 07052
Continuation-in-part of application Ser. No. 809,086, Mar. 21, 1969, which is a continuation-in-part of application Ser. No. 635,579, May 2, 1967, now Patent No. 3,460,252. This application Feb. 16, 1970, Ser. No. 11,577
Int. Cl. A61c 19/00
U.S. Cl. 32—2
65 Claims

ABSTRACT OF THE DISCLOSURE

Disclosed are devices and methods for forming a denture in-situ in the mouth of a dental patient. A liquid resin curable to a rigid plastic is placed over the upper portion of false teeth held in a tray, a thin shim which may be a porous shim including a gutter portion generally positioned over the teeth is placed on said resin, a second liquid resin curable to a semi-rigid plastic is placed over the shim, and the resulting assembly placed in the patient's mouth where pressure is applied and the resins cured to form the denture which is thereafter separated from the tray.

---

This application is a continuation-in-part of copending application Ser. No. 809,086, filed Mar. 21, 1969, which in turn is a continuation-in-part of application Ser. No. 635,579, filed May 2, 1967, now U.S. Letters Patent 3,460,252.

In U.S. Letters Patent 3,460,252 there is described various means and methods for forming a denture in-situ in the mouth of a dental patient.

An object of the present invention is to provide improvements in the in-situ formation of dentures.

Another object is to provide new and improved devices for use in the in-situ formation of dentures.

Another object is to provide improved methods for the in-situ formation of dentures.

A further object is to provide improved dentures formed by an in-situ method.

These and other objects of the present invention will be evident from the following description of the invention and accompanying drawings in which:

Referring to FIGS. 1–4, there is shown a thin flexible tray 20 which is preferably formed of a thin flexible plastic preferably in the family of polyethylene or polypropylene polymers or copolymers. The tray can be vacuum formed from a sheet of material. The tray could also be formed by any other known method such as injection or blow molding. The tray 20 is used for making an upper denture and the tray 22 is used for making a lower denture.

Figure 1:
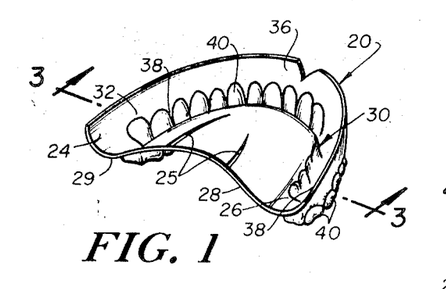
FIG. 1 is a perspective view showing an upper tray.
Figure 3:
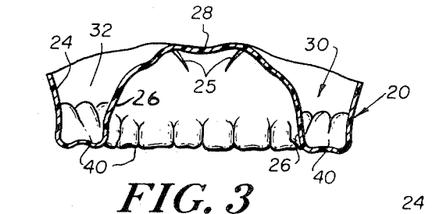
FIG. 3 is a section taken along line 3—3 of FIG. 1.

The upper tray 20 has the general shape or outline of the arch of the mouth and comprises an outer uprising flexible wall 24, an inner uprising flexible wall 26 and a palate portion 28. The inner and outer wall portions are interconnected along the integral bottom portion 29 of the tray.

Figure 2:
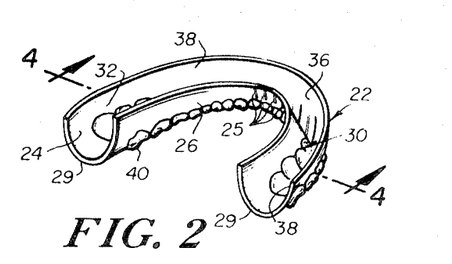
FIG. 2 is a perspective view showing a lower tray.
Figure 4:
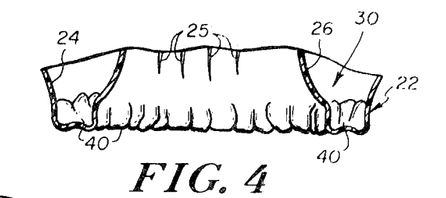
FIG. 4 is a section taken along line 4—4 of FIG. 2.

The lower tray 22 has the general shape and outline of the arch of the mouth and also includes a flexible outer uprising wall 24 and a flexible inner uprising wall 26 which walls are interconnected along the integral bottom portion 29 of the tray.

The outer wall 24 and inner wall 26 together with the bottom portion 29 can be taken collectively as forming a trough 30 of which the upper portion is a gum-receiving portion 32 designed to receive a patient's gums and of which the lower portion is designed to receive false teeth. The trough 30 is relatively narrow at the forward portion 36 of the tray and gradually increases in width along the side portion 38 of the tray as shown particularly in FIG. 5. Thus, the front teeth which are relatively narrow are snugly held in the tray and the rear teeth which are wider are snugly held in the wider portion of the tray.

Impressed within said lower portion of the trough 30 of the tray 20, as during molding or by any other suitable method of indicating, is indicia or cavities 40 preferably in the form of spaced or successive depressed pocket portions 40 which desirably are openly interconnected continuously along the arch of the trough. The latter indicia 40 indicate to the user the proper placement of the false teeth 42 within the tray 20 prior to making the dentures. Each tooth is thus snugly held within in a depression or pocket 40 and the teeth 42 are further held because the trough 30 increases gradually in width. The teeth 42 are therefore supported and cannot readily move out of place. Thus, there can be no leaning or turning movement of the teeth and alignment is always insured. The false teeth employed in the invention and disposed within the depressed portions 40 may be provided as a single cast unit containing all necessary teeth, or may be provided by a plurality of teeth sections containing one or more teeth or may all be provided as individual teeth.

Figure 5:
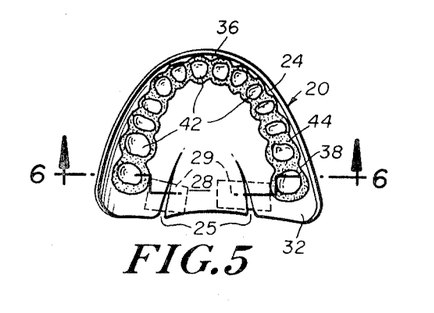
FIG. 5 is a top view showing a tray having severed portions.
Figure 6:
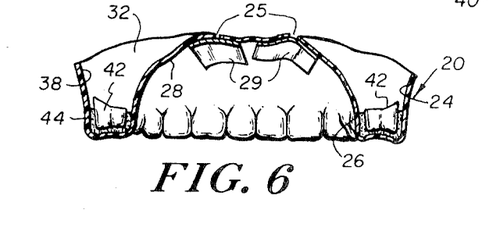
FIG. 6 is a view showing a tray in elevation and partly in section taken along line 6—6 of FIG. 5.

As shown in FIGS. 5 and 6, the false teeth 42 are individual teeth which are firmly and immovably held within the tray preferably with a rubber 44 of the silicone type to which a catalyst such as dibutyl tin dilaurate has been added. Any other binder material can be used to hold the false teeth together in the mold such as rubber of the non-silicone type, glue, wax or a mechanical means such as a brace can hold the teeth together. The purpose of the silicone rubber 44 or other type binder is to hold the teeth within the tray in proper space relation to each other and to avoid coverage of the individual teeth by the denture resin that would result in an extra cleaning step.

When the silicone rubber mix and catalyst are used, the mix is poured or injected into the trough 30 of the trays 20 and 22. The false teeth 42 are then placed into the mix as indicated by the indicia 40 on the walls, and the rubber 44 is allowed to cure whereupon the teeth will be immovably held in the tray. The rubber 44 will not adhere to the tray or false teeth firmly and is easily separated therefrom after the denture has been completed because of the nature of the materials.

Figure 10:
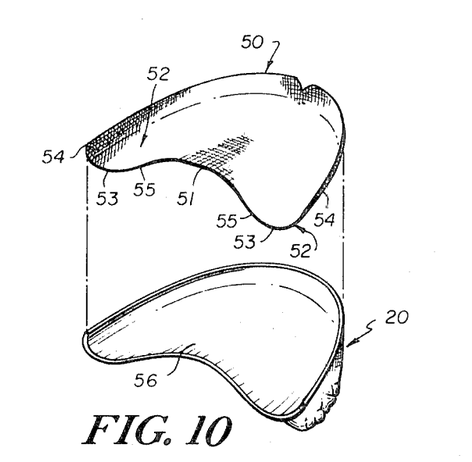
FIG. 10 is an exploded view showing a tray having a layer of resin thereon and a porous shim above said tray for placement on said resin.

The silicone rubber 44 or other binder could be dispensed with by molding pockets or depressions within the tray which more firmly grip and maintain the teeth closely adjacent to each other during the molding process. Thus, in another embodiment, the teeth may be conveniently a single cast set of integrally joined teeth prepared according to standard procedures using well known suitable materials such as the acrylate teeth-forming materials. Such a set of teeth may be prepared separately and fitted into the corresponding depressions 40 in the trough 30 or such a set of teeth may be conveniently formed by casting directly in the tray with acrylate tooth-forming material filling all the depressions 40 in the lower portion of the trough up to a level at which it is desired to have the gum-forming resin join with the teeth. A mold release material may be employed although it will be evident that the casting of a dissimilar material such as acrylate material in a polyolefin mold will present substantially no problem of separation of the resulting teeth from the tray. In FIG. 10 and subsequent figures cast complete sets of teeth 43 are employed, as particularly indicated in FIGS. 11 and 12. The upper surface of such castings which later contact the gum-forming materials may be relatively smooth or roughened somewhat to facilitate binding with the gum-forming material. In any event, the use in the more preferred embodiments of the invention of like materials for the teeth and gums, e.g. cast acrylic teeth and conventional acrylic gum-forming material, results in a strong like-to-like bond in the final denture.

As shown in FIGS. 1–6, the tray 20 has weakened lines or other indicia 25 conveniently placed thereon to be severed or indicate the preferred location of severing which permits the tray to be modified in size. Thus, the tray can be adapted to fit mouths of varying size by cutting the weakened lines and laterally squeezing or spreading the tray. The weakened lines 25 are shown as if severed in FIGS. 5 and 6 and an adhesive tape 29 can be used to lock the severed portions together when the proper size has been made to fit the mouth of the particular user, or if a portion is removed to make the tray smaller, the tape can be used to fill the void. The weakened lines 25 are preferably placed in the palate portion 28 on the upper tray 20. The palate portion 28 is shaped to conform to the average person's mouth and by simple adjusting after the weakened lines have been severed will fit mouths of varying size. The weakened lines 25 are placed on the inner wall on the lower tray 22.

In addition to the indicia or other contouring and marking of the trays 20 and 22 for purposes of providing for the location of teeth and severing for fitting of the trays, it will be evident that in general the appropriate surfaces of the trays forming the gums and palate of the final denture will have other variations in the form of contouring or relief which will be reproduced in the final denture to provide all the appearances of natural gums and palate. Such contouring or relief may be readily made on the trays employing suitably and correspondingly contoured molds during manufacture of the trays, e.g. by vacuum forming. The upper portion of the forward portion 36 of the uprising wall 24 of the upper tray 20 also preferably has a small V-shaped cutaway portion to allow for the Frenum muscle, as shown in FIG. 1. The back end of the upper tray along the palate portion and extending into the trough area is also preferably slightly turned up to allow for the post-dam area of the palate and to provide a better fit also adapted to assist in restraining undesirable escape or flow of liquid denture-forming material during formation of the final denture in the patient's mouth. When false teeth are positioned in the indicia or cavities 40 without the aid of a rubber or binder 44 as illustrated in FIGS. 10–14, then it is desirable to mold the walls of the tray and particularly the outer walls 24 in such a manner that there is a small outward step 41 therein to allow for the natural stepping out of the gum from the teeth of the patient, as shown particularly in FIG. 12.

Figure 7:
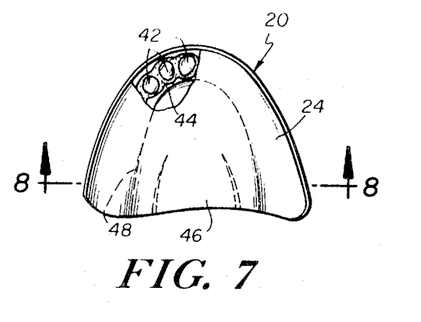
FIG. 7 is a top view of a tray having resin therein and a portion cutaway to show a plurality of false teeth beneath said resin.
Figure 8:
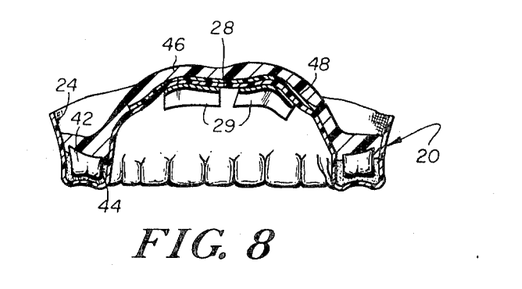
FIG. 8 is a vertical section taken along line 8—8 of FIG. 7.

The tray 20 or 22 with the teeth 42 or 43 therein is now ready to receive gum-forming denture material as a next step leading directly and very expeditiously to the formation of the final denture. In accordance with the basic method of in-situ denture formation as described in our prior application Ser. No. 635,579, now U.S. Pat. 3,460,-252, the gum-forming or denture material 46 is deposited on top of the teeth 42 and within the upper portion of the trough 30 and over the palate portion 28 in the case of the upper tray 20, substantially as shown in FIGS. 7 and 8. In said U.S. Pat. 3,460,252 we provided for the use of a thin shim 48 positioned at the upper surface of the palate portion 28 of the upper tray 20, said shim covering at least about the major portion of the palate portion and providing for a control of the thickness of the palate portion during formation of the denture and in the resulting formed denture itself.

The present invention contemplates, inter alia, various improvements in the use of shims and the like in the in-situ formation of dentures.

Figure 9:
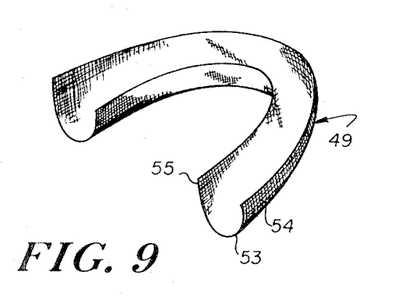
FIG. 9 is a perspective view of a porous gutter type shim preferably used in conjunction with a lower tray.
Figure 15:
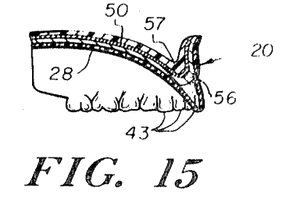
FIG. 15 is a vertical section taken line 15—15 of FIG. 13.

One feature of the present invention involves the use of a channel like flexible gutter shim means which may be a separate individual component such as the more or less arch shaped gutter shim 49 shown in FIG. 9 for use preferably with a lower tray 22 in forming a lower denture but which may also be used in the upper tray 20 or which may be taken as forming a gutter section 52 of an integral complete shim 50 shown in FIG. 10 for use with the upper tray 20 in forming an upper denture. A separate individual gutter shim of the type of shim 49 may be used alone or in combination with a palate shim 48 in formation of the upper denture, but it is especially preferred to employ the complete shim 50 in forming the upper denture. Thus, the preferred complete shim 50 comprises generally a palate portion 51 and a gutter section 52 integrally therewith, said gutter section 52 comprising a bottom portion 53 integral with an outer uprising wall portion 54 and inner uprising wall portion 55 forming a shim trough adapted to receive gum-forming material and the patient's gum. As shown in FIG. 9, the gutter shim 49 also comprises the outer uprising wall 54, inner uprising wall 55 and bottom portion 53 integral with said inner and outer walls forming a trough adapted to receive gum-forming material and a patient's gum. It will be noted as shown particularly in FIGS. 12, 14 and 15 that the gutter shim or gutter shim section is designed to be placed and fit loosely in the upper portion of the trough 30 where the gum-forming denture material is deposited. The shims are therefore desirably sized and shaped accordingly such that the shape and contours thereof appropriately conform to the shape of the tray with teeth thereon including the palate portion of an upper tray 20. However, it is not necessary that the upstanding wall portion 54 of a complete shim 50 or either upstanding wall portion of the gutter shim 45 exactly parallel the corresponding portions of their respective trays as the preferred shims are flexible and deviations from the optimum are corrected by the gum-forming denture material flowing on the opposing sides of such shims during the formation of the denture in the patient's mouth. The shims 49 and 50 may be made from any of several materials, i.e., fabrics, including fabrics which are solid non-porous materials or porous materials as hereinafter described. In general, it is preferred that the shim be composed of sufficient acrylic material to obtain the benefit of liketo-like bond with the acrylic denture-forming material. It is also preferred that the shims be pigmented or otherwise colored pink or the color of natural gums to promote obscurity within the denture of any portion of the shim near the surface of the denture. In general, the shims contemplated by the present invention have thickness in the range of from about 0.02 inch to 0.12 inch, preferably between about 0.03 inch to 0.07 inch.

Another feature of the present invention relates to the further advantages obtained when a shim of the types useful in the in-situ formation of dentures is a porous shim, the term "porous" being used herein in the open communicating sense to indicate a depression or opening communicating with at least one of two opposing surfaces of the shim, the shims generally more preferably having porosity which is "through" porosity in the sense of communicating between the opposing surfaces of the shim. The porous shims generally have the property of holding or absorbing curable liquid denture-forming material during denture formation. On the other hand the porous shims provided by the present invention also have substantial surface area or bulk and hence it is not contemplated by the invention to provide merely a component having very large openings formed by a very thin network of supporting structure. The porous shims provided by the invention therefore desirably have a porosity or open volume of at least about 15% ranging up to about 85%, preferably between about 25% to 75%. The preferred shims having through porosity have their openings of a size of at least sufficient to permit the flow of curable liquid resin material from one side of the shim to the opposite side or to a central portion thereof sufficient to be joined to liquid material flowing from said opposite side under the mild pressure applied during in-situ denture formation and before substantial curing of the resin, i.e., within a period of no more than 3 to 15 minutes. The shim is preferably at least sufficiently porous to readily permit the flow of liquid resin material therethrough. The porosity is preferably provided in the shims by a plurality of separate surface opening preferably measuring in the range of from about 0.007 inch to 0.13 inch, more preferably in the range of from about 0.02 inch to 0.06 inch, as measured as an average through the center point of the openings which are preferably circular or rectangular openings of more or less equal length sides. Increasing the size of straight through continuous opening communicating between opposing shim sides in excess of about 0.15 inch tends to increasingly depreciate the benefits of using such a porous shim and thus such large openings are desirably avoided in any significant number in such porous shims provided by the invention. Roughly speaking, the preferred shims approximate a screen size in the range of from 6 to 80 Tyler Standard Mesh, and the more preferred shims approximate a screen size in the range of from 10 to 35 Tyler Standard Mesh.

The porous shim provided by the invention may be fabricated from any of a variety of fabrics and the term "fabric" is used herein in its broad sense. It is of course required that the fabric be capable of being shaped into the desired shape of the shim. However, such ability to be shaped may be inherent in the fabric per se and accomplished by such conventional methods as pressing, stamping, molding, vacuum forming and the like, or may be accomplished by treatment of the fabric with a stiffening material, for example, by lacquering, varnishing, coating, painting and the like. The shim may thus be prepared from a sheet of any of a variety of materials or fabrics such as thin plastic sheets or foil of metals which have or will be stamped or perforated or otherwise processed to obtain the desired porosity, or from fabrics which are known conventionally in the textile art as non-woven fabrics or from materials which are woven fabrics. In general, it is preferred that the shim be of an acrylic material to the extent of containing some portion of an acrylic resin or polymerized acrylic monomer sufficient to provide the better bond obtainable between the shim and the gum-forming plastic material on the basis of like materials being bonded to like material. Very good results are obtained with treated or stiffened woven fabrics. The preferred shims are therefore formed of woven fabric composed of acrylic strands by shaping the acrylic fabric and treating as by bushing or painting with a solvent solution of an acrylic monomer followed by drying to obtain the shaped shim. An example of such a solvent solution is a solution of a methyl methacrylate resin dissolved in a mixture of toluene and methyl ethyl ketone. A preferred such woven acrylic fabric has been obtained under the trademark Dynel which is composed of about .0196 inch thick threads of a modified acrylic polymer containing 35–85% acrylonitrile and having 22 x 20 threads per inch. The preferred gutter shim 49 for use in forming a lower or upper denture and the preferred palate shim 48 and the especially preferred complete shim 50 for use in the upper denture are therefore composed of the preferred woven acrylic fabric heretofore described. A particularly preferred shim for use in forming a denture is prepared by bonding together as by painting together or the like two overlapping layers of the preferred acrylic woven fabric. In general, the use of a porous shim provides distinct advantages and improvements realized both during formation of the denture and in the resulting denture itself. Hence, the porous shim results in liquid resin flowing into the openings thereof and results in very good bonding of the shim within the resulting denture and especially when resin flowing from each side of the shim is joined and cured together resulting in greater strength and integrity of the resulting denture. The uneven nature of the surface of the porous shim also improves the flow characteristics of the liquid resin during the application of pressure in the denture formation resulting in a more controlled flow and distribution of the liquid material and generally an improved denture in which there is less tendency for the formation of voids and weakened area.

It will be evident that the above-mentioned advantages in using a porous shim are obtained when employing only a porous palate shim 48 and hence the present invention contemplates as one aspect thereof the improvement in in-situ denture formation involving the use of a palate shim 48 which is a porous palate shim.

In the method of forming a denture as shown in FIG. 8 employing a palate shim 48 the denture material 46 is deposited in the trough 30 over the teeth 42 and over the shim 48 and any portion of the palate portion 28 of the tray 20 not covered by the shim 48. Alternately, a thin layer of denture material may be spread over the entire palate portion 28 and the palate shim 48 then placed thereon and an additional layer of denture material deposited on the shim. In either case the resulting assembly including tray 20 with teeth 42 or 43 and shim 48 and denture material 46 is then ready for insertion into the mouth of the patient where the denture material takes the shape of the patient's upper gum and cures in a relatively short period of about 3 to 15 minutes at mouth temperature at least sufficiently to retain the shape of the gum portion of the denture with outer exposed surfaces retaining the shape and contours simulating a normal gum and palate as determined by the inner wall 26, outer wall 24 and palate portion 28 of the tray 20. The resulting structure is then removed from the patient's mouth, the tray 20 separated from the thus formed denture and the denture trimmed or smoothed off as may be desired or required.

Figure 11:
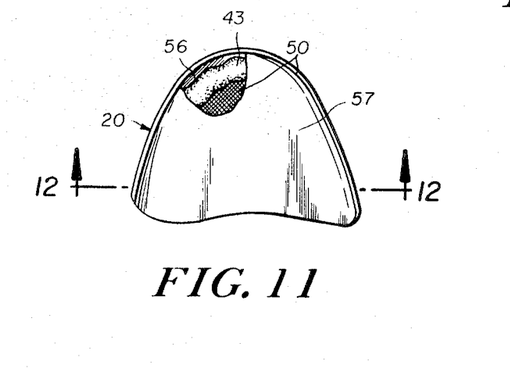
FIG. 11 is a top view of a tray having resin therein and a portion cutaway to show false teeth cast as a unit in said tray beneath the resin.
Figure 12:
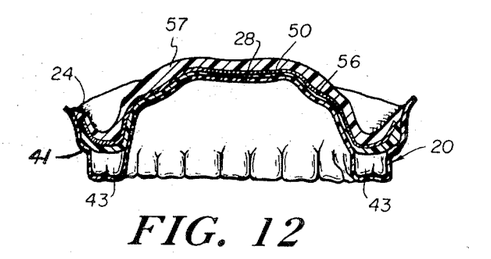
FIG. 12 is a vertical section taken along line 12—12 of FIG. 11.
Figure 13:
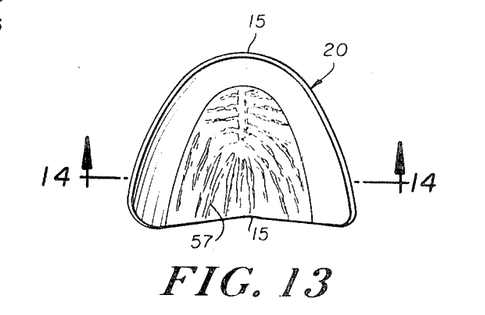
FIG. 13 is a top view of a finished denture within a tray.
Figure 14:
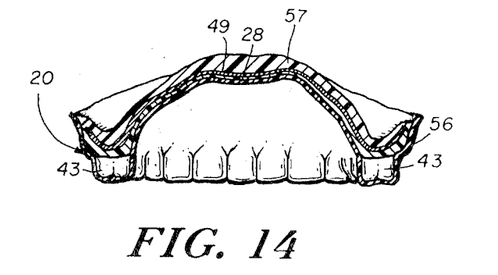
FIG. 14 is a vertical section taken along line 14—14 of FIG. 13.

In the method of forming a denture as shown in FIGS. 10, 11 and 12 employing a complete shim 50 a first layer of denture material 56 is deposited in the upper portion of the trough 30 over the teeth 43 and over the remainder of the exposed upper surface area of the tray 20 including the palate portion 28. The complete shim 50 is then placed in position in the tray 20 on the first layer of denture material 56 and desirable in such a manner that the entire available surface area of the denture material 56 is in wetting contact with the underside area of the shim 50, except that the upper end portion of the upstanding wall portion 54 may be left free of denture material. Alternately and preferably, the denture material of the first layer in the palate area may be applied directly to the underside of the palate portion of the shim before placing the shim in contact with the tray. A second layer of gum-forming or denture material 57 is then deposited on the upper exposed surface of the shim 50 covering the exposed area of the shim 50 vertically above the teeth and desirably spread or applied to cover the entire exposed area of the shim 50 including the palate portion except that the marginal or horizontal ridge portion of the upstanding wall 54 of the shim 50 which may be left uncovered as this portion will be subsequently covered and surrounded by denture material flowing under the pressure applied during the formation of the denture in the patient's mouth. When the denture materials are spread over all appropriate surfaces as desired the ratio by volume of denture material 56 in the first layer to denture material 57 in the second layer is suitably in the range of about 1:3 to about 1:1, and is preferably approximately about 2:3. The preparation of a denture-forming assembly employing a gutter shim 49 for use in forming a lower denture in conjunction with a lower tray 22 is accomplished analogously using two layers of denture material, as described. The resulting assembly for forming an upper or lower denture employing a complete shim 50 or gutter shim 49 is then ready for placement in the mouth of the patient and formation of the denture in the manner described. The use of a gutter shim 49 or complete shim 50 with its gutter portion has been found to have distinct advantages in the formation of the denture and also in the resulting denture. Thus, the presence of the gutter shim or gutter portion in the trough or gum-forming area provides additional bulk and appropriately placed additional surface areas providing desired and improved control, distribution and directioning of the liquid denture material during denture formation and resulting in more uniform thickness and improved shaping of the denture especially in the more critical areas such as between the gums of the patient and the flexible walls of the trays and also resulting in greater resistance to the formation of voids in the denture and also in improved strength of the denture. These and other benefits are even more particularly realized when the gutter shim or gutter portion of the shim is a porous material in accordance with the more preferred embodiments of the invention.

In general, the denture material 46, 56 and 57 is a cold curing pigmented mixture consisting of a powder and a liquid. The powder is a polymer preferably of the acrylic family. Certain copolymers can also be used consisting of vinyl resins or styrene. The liquid material is preferably an acrylic monomer or mixture of acrylic monomers such as methyl methacrylate and butyl methacrylate. Such materials have been well known and used in the prior art, for example, as denture repair materials. The powder and liquid contain small quantities of known catalysts which interact to cause hardening of the mixture within a short time without any external heat source. The denture material may form a so-called "rigid" denture material or a more flexible type denture material and the distinction between rigid materials and other materials which are less rigid and softer is well recognized in the denture art. Cold-curing resins used in the denture art often have varying tendency to cause discomfort during curing in contact with the gums of a dental patient primarily because of a stinging sensation which may or may not be reasonably tolerated by the patient. Contact of the curable resin with the gums of a patient's mouth can be avoided by enclosing the denture-forming assembly in a thin envelope as described in our U.S. Pat. 3,460,252. The use of such a protective envelope may be dispensed with however by selecting denture materials more suitable for direct contact with the gums without causing any substantial discomfort. Such a more suitable rigid type material is available commercially under the trade name "Tru-liner," and such a more suitable soft type material is available commercially under the trade name "Soft-Line." Components for another more suitable and preferred semi-hard denture material for use in the invention have been obtained on special order from the American Consolidated Mfg. Co. of Philadelphia, Pa., and is prepared by mixing 10.3 gms. of a powder component obtained as special order component 3–A with 8.0 cc. of a liquid component obtained as special order component 2–A.

Figure 16:
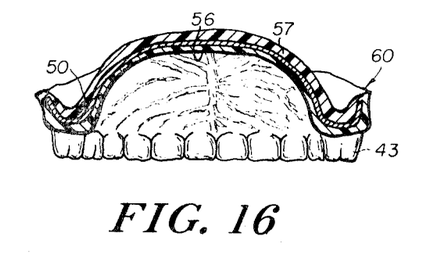
FIG. 16 is a side elevation view partly in section showing a completed upper denture after removal of the tray used in forming the denture.

In accordance with another feature of the present invention it has been found that both a rigid and semi-rigid denture material may be used in combination with distinct advantages in the in-situ formation of a denture in the mouth of a dental patient. Thus, referring to FIGS. 11 et seq. and in accordance with a preferred embodiment of the invention, the first layer of denture material 56 is a rigid denture material while the second layer of denture material 57 is a semi-rigid denture material. As shown particularly in FIG. 16, the use of both such types of denture materials make it possible to form a final denture 60 in which the outer surfaces of the denture including both the gums and palate portion normally exposed to saliva, food, smoke and the like are formed of a rigid material and the false teeth joined to the formed denture by rigid material, while the inner or non-exposed surfaces of the denture in direct contact with the gums and palate are formed of a semi-rigid material. The use of the semi-rigid denture material 57 has been found desirable in an in-situ formed denture because of the closeness of the fit and conformity to the patient's gums thus permitting greater comfort and greater ease in the removing and installing of the denture. The use of a semi-rigid denture material 57 is also highly desirable when the gums of the patient have unusual protuberances or undercut areas which might otherwise become troublesome if a rigid material were used in an in-situ formed denture. On the other hand, the denture shown in FIG. 16 has its outer or exposed surfaces composed of a rigid material which has the known advantages of a rigid denture material including resistance to denting, loss of shape, staining, discoloring and the like. A lower denture (not shown) is similarly desirably prepared employing the combination of rigid and semi-rigid denture material. It will also be noted that the use of a gutter shim 49 or complete shim 50 having a gutter section 52 facilitates and improves the formation of dentures utilizing different denture materials, e.g., both a rigid and semi-rigid denture material. Thus, in general, the use of such a shim provides means insuring a good and appropriate division or demarcation between the two types of denture materials. Moreover, such shims contribute to the control and direction of the flow of the denture material 56 in the space between the shim and tray improving uniformity of the resin layer and particularly insuring that the desired amount of rigid denture material 56 flows between the outer upstanding wall portion 54 of the shim and the outer flexible wall 24 of the tray 20 while the desired amount of semi-rigid material flows between the wall portion 54 and the gum of the patient. Similar desirable results are obtained in the palate area when forming an upper denture, and also in the formation of a lower denture employing the different types of denture materials.

As previously stated, the denture art well recognizes the distinction between rigid denture materials and those other materials which are less rigid and softer and such other materials are referred to herein as "semi-rigid" materials. For purposes of definition herein we divide the semi-rigid materials into two sub-classes referred to as "semi-hard" and "soft" denture materials respectively. A suitable distinction for purposes of the present invention and description thereof may be made according to the conventional 3-point Deflection Test given in the Interim Federal Specification W–R–00179a (DSA–DM) of Feb. 20, 1967, such that a "rigid" denture material will have a maximum deflection not exceeding about 1.7 millimeters when determined in accordance with the standard test under an initial 1500 gm. load increasing to a maximum 2500 gm. load while a "semi-rigid" denture material has a deflection exceeding 1.7 millimeters. The semi-hard materials are further defined herein as having a deflection in the range of deflections exceeding 1.7 but not exceeding about 4.0 while those exceeding a deflection of 4.0 are defined as soft materials. Preferably the rigid material has a deflection between about 1.0 to 1.5 millimeters while the preferred semi-hard material has a deflection between about 1.8 to 3.5 millimeters. The semi-hard materials are those preferred for use in combination with a rigid material in forming a denture in accordance with the invention.

The following is representative of a step-by-step procedure for forming an upper denture in accordance with a preferred embodiment of the invention.

(A) A tray of approximately appropriate size containing a cast set of acrylic teeth of correct or desired shade is selected to provide an assembly such as illustrated in FIG. 6 or FIG. 12 (without the shim or resin therein). This assembly is then inserted into the mouth of the patient for purposes of arriving at the correct fitting and alignment of the tray and determining necessary adjustments. The vertical fitting of the tray is determined by establishing the desired distance allowing for denture material between the teeth in the tray and lower ridge of the gum in the front of the mouth and determining to what extent, if at all, the upper portion of the outer uprising wall of the tray must be trimmed to obtain such distance during the forming step. Any excess portions of the plastic tray wall are then readily trimmed or removed with a scissors. Lateral fitting of the tray is determined with reference to the back portion of the tray by establishing the gum in the gum-receiving portion of the trough and determining whether the particular tray is too wide or narrow. If lateral correction is required the palate portion is severed along the weakened lines or indicia provided for this purpose again using a scissors and adhesive tape is then used to fix the tray at the desired width. Such vertical and lateral adjustments provide a corrected adapted tray fitting over the gum slightly loosely and just sufficiently to allow for the shim and denture material.

(B) The shim comprising a shaped laminate of two layers of Dynel cloth is then preliminarily placed in the tray and the outer uprising wall of the shim trimmed with a scissors if necessary so that the upper edge of the outer shim wall is about 0.03–0.06 inch below the upper edge of the outer wall of the tray. The correctly sized shim is removed from the tray.

(C) The surfaces on both sides of the shim are then lightly painted with the liquid acrylic monomer component of the type to be used in forming the rigid denture-forming material. The purpose of this treatment is to size or fill in between the fibers of the strands of the acrylic fabric of the shim without substantially filling in or blocking the openings in the shim.

(D) The liquid and powder components of a cold-curing rigid denture-forming material are then brought together by adding 5 cc. of the liquid monomer to 7.0 gms. of the pigmented resin powder and vigorously mixing with a small spoon for about 15 seconds. About one-half of the resulting liquid mixture is poured and distributed evenly over the top of the teeth in the tray and the remaining one-half of the material spread evenly over the under or outer surface of the palate portion of the shim.

(E) The shim is then placed and positioned in the tray and pressed down lightly to insure that the denture material in the tray is in wetting contact with the under surface of the bottom portion of the gutter section of the shim and to insure that the denture material on the palate portion of the shim is in wetting contact with the entire corresponding surface of the palate portion of the tray, such that the denture material now covers all the upper surfaces of the tray and adjacent outer surface of the shim except at the upper edge of the outer wall of the tray and shim.

(F) The liquid and powder components of a cold-curing semi-rigid denture-forming material are then brought together by adding 8.0 cc. of the liquid monomer to 10.3 gms. of the pigmented resin powder and vigorously mixing with a small spoon for about 15 seconds. The total of the resulting mixture is disposed onto the shim and distributed over most of the upper or inner surface of the shim except at the upper edge of the outer wall with an appropriately deeper layer or reservoir of denture material in the bottom of the trough of the shim formed by the inner and outer walls and bottom portion thereof.

(G) The mouth of the patient is rinsed with cold water and the tray then inserted therein. The patient then applies firm but mild pressure by closing of the mouth or by pressing of the tongue against the under surface of the palate portion of the tray. A check is made to determine if the bite is correct. If there is no opposing bite a wax rim or other suitable device may be inserted into the mouth for occlusional bite. Finger pressure is then applied to the front surfaces of the tray to force any excess denture-forming material from this area.

(H) About 1 to 2 minutes have now elapsed since the tray was placed in the mouth and the tray is allowed to remain in the mouth for an additional 5–8 minutes with the continued application of firm but mild pressure to the palate portion by the tongue of the patient. At the end of this period the denture-forming material has gelled or hardened sufficiently to take and retain the desired shapes and the tray with formed denture therein is removed from the mouth.

(I) Excess denture material if any may be readily trimmed and/or smoothed off from the formed denture while in the tray using a suitable common instrument such as a scissors. The tray is separated from the formed denture which may be facilitated by using a dull knife or spatula. The separated denture is then preferably washed with cold water and inserted into the mouth to check for bites. Desired corrections such as in the bite, if any, may then be made by grinding of appropriate teeth in a conventional manner. The separation between the cast teeth can also be made more pronounced by cutting with a disc, if desired. The denture is then ready for use by the patient.

Various preferred embodiments of the present invention have been described for purposes of illustration only and shall not be taken as having a limiting effect on the scope thereof. In particular, it will be evident that the various improvements provided by the present invention may be realized in general in the in-situ formation of dentures involving methods utilizing a devise or assembly carrying false teeth and having wall means establishing a gum-receiving portion or trough adapted to hold denture-forming material which is curable at mouth temperatures to take the shape of and fit to a patient's gum, including especially devises or assemblies in which inner and outer removable wall portions form the gum-receiving trough and in which the curable denture-forming material functions to join together the resulting artificial gum and the false teeth. It will also be evident that various modifications will be apparent to those skilled in the art and may be made without departing from the scope and spirit of the present invention.

The shims provided by the invention are thin articles defined herein as having two opposing surfaces of substantial surface area. For purpose of describing and defining the shims and the surfaces thereof it will be noted that various terms may be used with reference to such respective surfaces such that the surface which faces or will face the denture-forming assembly or tray is referred to as the "first" surface, or "outer" surface or "under" surface of the shim while the surface which faces or will face the gum and/or palate of the patient is defined as the "second" surface, or "opposite" surface, or "inner" surface or "upper" surface of the shim.

What is claimed is:

1. In an assembly for forming a denture in-situ in the mouth of a dental patient comprising false teeth and having uprising inner and outer wall portions forming a gum-receiving portion and curable denture-forming material in at least said gum-receiving portion; the improvement comprising a first layer of denture-forming material, a thin shim comprising uprising inner and outer wall portions and bottom portion integral therewith forming a shim trough disposed in said gum-receiving portion, said shim having a first surface and an opposite surface with said first surface in wetting contact with said first layer, and a second layer of denture-forming material on said opposite shim surface.

2. An assembly in accordance with claim 1 for forming an upper denture in which a palate portion is integral with the inner wall portion of said assembly, in which said shim has a palate portion integral with the shim inner wall, in which said first layer is also disposed in wetting contact with said assembly palate portion and adjacent first surface of the palate portion of the shim and in which said second layer is also disposed in wetting contact on the opposite surface of the palate portion of the shim.

3. An assembly in accordance with claim 1 in which the shim is a porous shim.

4. An assembly in accordance with claim 1 in which the first layer of denture-forming material is a rigid denture-forming material and in which the second layer of denture-forming material is a semi-rigid denture forming material.

5. An assembly in accordance with claim 4 in which the shim is a porous shim.

6. In an assembly for forming a denture in-situ in the mouth of a dental patient comprising false teeth and having inner and outer removable wall portions forming a gum-receiving portion and having a curable denture-forming material disposed in at least said gum-receiving portion in contact with the upper portion of the false teeth carried by said assembly; the improvement comprising a first layer of denture-forming material, a thin shim comprising uprising inner and outer wall portions and bottom portion integral therewith forming a shim trough disposed in said gum-receiving portion, said shim having a first surface and an opposite surface with said first surface in wetting contact with said first layer, and a second layer of denture-forming material on said opposite shim surface.

7. An assembly in accordance with claim 6 for forming an upper denture in which a palate portion is integral with the inner wall portion of said assembly, in which said shim has a palate portion integral with the shim inner wall, in which said first layer is also disposed in wetting contact with said assembly palate portion and adjacent first surface of the palate portion of the shim and in which said second layer is also disposed in wetting contact on the opposite surface of the palate portion of the shim.

8. An assembly in accordance with claim 6 in which the shim is a porous shim.

9. An assembly in accordance with claim 6 in which the first layer of denture-forming material is a rigid denture-forming material and in which the second layer of denture-forming material is a semi-rigid denture-forming material.

10. An assembly in accordance with claim 9 in which the shim is a porous shim.

11. An assembly in accordance with claim 6 in which the inner and outer wall portions are interconnected by an integral bottom portion to form a trough having a lower portion in which the false teeth are carried and an upper portion defining the gum-receiving portion.

12. An assembly in accordance with claim 9 in which the inner and outer wall portions are interconnected by an integral bottom portion to form a trough having a lower portion in which the false teeth are carried and an upper portion defining the gum-receiving portion.

13. In a method of forming a denture in-situ in the mouth of a dental patient comprising providing and inserting into the mouth an assembly comprising false teeth and having uprising inner and outer wall portions forming a gum-receiving portion and having curable denture-forming material in at least said gum-receiving portion, and retaining said assembly in the mouth for at least a time to cure said denture-forming material sufficiently to retain the shape of the gum of the patient; the improvement comprising providing an assembly having: (a) a first layer of denture-forming material in at least said gum-receiving portion; (b) a thin shim comprising uprising inner and outer wall portions and bottom portion integral therewith forming a shim trough disposed in said gum-receiving portion, said shim having a first surface and an opposite surface with said first surface in wetting contact with said first layer; and (c) a second layer of denture-forming material on said opposite shim surface, and inserting said assembly into the mouth with the gum of the patient within said shim trough.

14. The method of claim 13 in which an upper denture is formed, in which said assembly includes a palate portion integral with the inner wall thereof, in which the shim includes a palate portion integral with the shim inner wall, in which said first layer is also disposed in wetting contact with said assembly palate portion and adjacent first surface of the palate portion of the shim and in which said second layer is also disposed on the opposite surface of the palate portion of the shim.

15. The method of claim 13 in which the shim is a porous shim.

16. The method of claim 13 in which the first layer of denture-forming material is a rigid denture-forming material and in which the second layer of denture-forming material is a semi-rigid denture-forming material.

17. The method of claim 16 in which the shim is a porous shim.

18. In a method of forming a denture in-situ in the mouth of a dental patient comprising providing and inserting into the mouth an assembly having inner and outer removable wall portions forming a gum-receiving portion and having curable denture-forming material in at least said gum-receiving portion, retaining said assembly in the mouth for at least a time to cure said denture-forming material sufficiently to retain the shape of the gum of the patient and bond to false teeth carried by said assembly, and thereafter separating said wall portions from the thus formed denture; the improvement comprising providing an assembly by having: (a) a first layer of denture-forming material in at least said gum-receiving portions; (b) a thin shim comprising uprising inner and outer wall portions and bottom portion integral therewith forming a shim trough disposed in said gum-receiving portion, said shim having a first surface and an opposite surface with said first surface in wetting contact with said first layer; and (c) a second layer of denture-forming material on said opposite surface, and inserting said assembly in to the mouth with the gum of the patient within said shim trough.

19. The method of claim 18 in which an upper denture is formed, in which said assembly includes a palate portion integral with the inner wall thereof, in which the shim includes a palate portion integral with the shim inner wall, in which said first layer is also disposed in wetting contact with said assembly palate portion and adjacent first surface of the palate portion of the shim and in which said second layer is also disposed on the opposite surface of the palate portion of the shim.

20. The method of claim 18 in which the shim is a porous shim.

21. The method of claim 18 in which the first layer of denture-forming material is a rigid denture-forming material and in which the second layer of denture-forming material is a semi-rigid denture-forming material.

22. The method of claim 21 in which the shim is a porous shim.

23. The method of claim 19 in which the shim is a porous shim.

24. The method of claim 19 in which the first layer of denture-forming material is a rigid denture-forming material and in which the second layer of denture-forming material is a semi-rigid denture-forming material.

25. The method of claim 24 in which the shim is a porous shim.

26. A method for forming a denture in-situ in the mouth of a patient comprising:
 (A) providing a tray having uprising inner and outer wall portions and bottom portion integral therewith forming a trough having a lower portion having false teeth therein and upper gum-receiving portion adapted to receive a gum of the patient,
 (B) disposing in said tray: (a) a first layer of denture-forming material in at least said gum-receiving portion; (b) a thin shim comprising uprising inner and outer wall portions and bottom portion integral therewith forming a shim trough within said gum-receiving portion, said shim having a first surface and an opposite surface with said first surface in wetting contact with said first layer; and (c) a second layer of denture-forming material on said opposite shim surface.
 (C) inserting the resulting assembly in the mouth of the patient,
 (D) retaining said assembly in the mouth of the patient with the gum of the patient within the shim trough for at least a time to cure said denture-forming material sufficiently to retain the shape and contour of said gum, and
 (E) removing said tray with formed denture therein from the mouth and thereafter separating said tray from said formed denture.

27. The method of claim 26 in which a lower denture is formed.

28. The method of claim 27 in which the shim fabric is a porous fabric.

29. The method of claim 28 in which the porous shim fabric is a woven fabric.

30. The method of claim 29 in which the woven fabric is a woven acrylate fabric having openings measuring in the range of from 0.007 inch to 0.13 inch and in which said shim has porosity in the range of from 25% to 75%.

31. The method of claim 27 in which said first layer of denture-forming material is a rigid denture-forming material and in which said second layer is a semi-rigid denture-forming material.

32. The method of claim 31 in which the shim fabric is a porous fabric.

33. The method of claim 32 in which the porous shim fabric is a woven fabric.

34. The method of claim 33 in which the woven fabric is a woven acrylate fabric having openings measuring in the range of from 0.007 inch to 0.13 inch and in which said shim has porosity in the range of from 25% to 75%.

35. The method of claim 34 in which said shim comprising two joined together overlapping layers of said woven acrylate fabric.

36. The method of claim 26 in which an upper denture is formed, in which said tray includes a palate portion integral with the tray inner wall, in which said shim includes a palate portion integral with the shim inner wall, in which said first layer of denture-forming material is also disposed in wetting contact with said tray palate portion and adjacent first surface of the palate portion of the shim and in which said second layer of denture-forming material is also disposed in wetting contact on the opposite surface of the palate portion of the shim.

37. The method of claim 36 in which the shim fabric is a porous fabric.

38. The method of claim 37 in which the porous shim fabric is a woven fabric.

39. The method of claim 38 in which the woven fabric is a woven acrylate fabric having openings measuring in the range of from 0.007 inch to 0.13 inch and in which said shim has porosity in the range of from 25% to 75%.

40. The method of claim 36 in which said first layer of denture-forming material is a rigid denture-forming material and in which said second layer is a semi-rigid denture-forming material.

41. The method of claim 40 in which the shim fabric is a porous fabric.

42. The method of claim 41 in which the porous shim fabric is a woven fabric.

43. The method of claim 42 in which the woven fabric is a woven acrylate fabric having openings measuring in the range of from 0.007 inch to 0.13 inch and in which said shim has porosity in the range of from 25% to 75%.

44. The method of claim 43 in which said shim comprises two joined together overlapping layers of said woven acrylate fabric.

45. A denture formed in-situ in the mouth of a patient comprising false teeth joined to a gum portion of denture material, said gum portion comprising an outer uprising gum and inner uprising gum integral with a lower portion joining said teeth to said denture and forming a gum-receiving portion vertically with respect to said bottom portion and teeth, and imbedded within said gum portion a shim comprising inner and outer uprising wall portions and bottom portion integral therewith, said inner wall of said shim being imbedded in the inner wall of the gum portion, said outer wall of the shim being imbedded within the outer wall of the gum portion and the bottom portion of the shim being imbedded with the lower portion of said gum portion.

46. A denture in accordance with claim 45 which is a lower denture.

47. A denture in accordance with claim 46 in which the shim fabric is a porous fabric.

48. A denture in accordance with claim 47 in which the shim fabric is a woven fabric.

49. A denture in accordance with claim 48 in which the woven fabric is a woven acrylate fabric having openings measuring in the range of from 0.007 inch to 0.13 inch and porosity in the range of from 25% to 75%.

50. A denture in accordance with claim 45 which is an upper denture and further comprises a palate portion of denture material integral with the inner uprising gum of the gum portion.

51. A denture in accordance with claim 47 in which the shim fabric is a porous fabric.

52. A denture in accordance with claim 50 in which the shim further comprises a palate portion integral with the inner uprising wall portion of the shim and imbedded in the palate portion of said denture.

53. A denture in accordance with claim 50 in which the shim fabric is a porous fabric.

54. A denture in accordance with claim 51 in which the shim fabric is a woven fabric.

55. A denture in accordance with claim 52 in which the woven fabric is a woven acrylate fabric having openings measuring in the range of from 0.007 inch to 0.13 inch and porosity in the range of from 25% to 75%.

56. A denture in accordance with claim 45 in which the denture material on the side of the shim facing the normally exposed surfaces of the denture is a rigid denture material and the denture material on the opposite side of the shim is a semi-rigid denture material.

57. A denture in accordance with claim 45 in which the denture material on the side of the shim facing the normally exposed surfaces of the denture is a rigid denture material and the denture material on the opposite side of the shim is a semi-rigid denture material.

58. A denture in accordance with claim 47 in which the denture material on the side of the shim facing the normally exposed surfaces of the denture is a rigid denture material and the denture material on the opposite side of the shim is a semi-rigid denture material.

59. A denture in accordance with claim 48 in which the denture material on the side of the shim facing the normally exposed surfaces of the denture is a rigid denture material and the denture material on the opposite side of the shim is a semi-rigid denture material.

60. A denture in accordance with claim 52 in which the denture material on the side of the shim facing the normally exposed surfaces of the denture is a rigid denture material and the denture material on the opposite side of the shim is a semi-rigid denture material.

61. A denture in accordance with claim 53 in which the denture material on the side of the shim facing the normally exposed surfaces of the denture is a rigid denture material and the denture material on the opposite side of the shim is a semi-rigid denture material.

62. A denture in accordance with claim 55 in which the denture material on the side of the shim facing the normally exposed surfaces of the denture is a rigid denture material and the denture material on the opposite side of the shim is a semi-rigid denture material.

63. A denture in accordance with claim 62 in which said shim comprises two joined together overlapping layers of said woven acrylate fabric.

64. A method for forming an upper denture in-situ in the mouth of a patient comprising:

(A) providing a tray having uprising inner and outer wall portions and bottom portion integral therewith forming a trough and having a palate portion integral with said inner wall, said trough having a lower portion having false teeth secured therein and upper portion adapted to receive the upper gum of the patient,
(B) disposing a thin shim of porous fabric over the palate portion of said tray,
(C) disposing a cold-curing denture-forming material in said tray over the teeth in said trough and over the palate portion including said shim,
(D) inserting the resulting assembly into the mouth of the patient,
(E) retaining said assembly in the mouth of the patient with the gum of the patient within said trough for at least at time to cure the denture-forming material sufficiently to retain the shape and contours of the gum and palate of the patient,
(F) removing said tray with formed denture therein from the mouth and thereafter separating said tray from said formed denture.

65. The method of claim 13 in which the shim fabric is a woven fabric and has porosity in the range of from 25% to 75%.

References Cited
UNITED STATES PATENTS

| | | | |
|---|---|---|---|
| 1,955,709 | 4/1934 | Kinsley | 32—17 |
| 2,053,914 | 9/1936 | Mann | 32—17 |
| 2,634,500 | 4/1953 | McAdoo | 32—17 |

ROBERT PESHOCK, Primary Examiner